United States Patent [19]

Scott

[11] Patent Number: 5,135,342
[45] Date of Patent: Aug. 4, 1992

[54] TAMPER PROOF FASTENING APPARATUS

[76] Inventor: Douglas D. Scott, 68020 Valley Vista Dr., Cathedral City, Calif. 92234, now by change of name from Douglas D. McNamee

[21] Appl. No.: 695,667

[22] Filed: Feb. 15, 1991

[51] Int. Cl.⁵ .............................................. F16B 21/00
[52] U.S. Cl. ........................................ 411/338; 411/3; 411/8
[58] Field of Search ...................... 411/910, 13, 1, 2, 3, 411/8, 916, 366, 378, 390, 395, 396, 411, 414, 423, 437, 433, 338

[56] References Cited

U.S. PATENT DOCUMENTS

| | | | |
|---|---|---|---|
| 643,045 | 2/1900 | Denis | 411/922 X |
| 2,565,852 | 8/1951 | Ickes et al. | 411/378 |
| 2,843,309 | 7/1958 | Wheeler | |
| 3,238,835 | 3/1966 | Rosenberg | 411/338 |
| 3,251,260 | 5/1966 | Serdechny | 411/338 |
| 3,974,938 | 8/1976 | Steadman | |
| 3,994,412 | 11/1976 | DiFiglio | |
| 4,175,604 | 11/1979 | Bonner | |
| 4,436,273 | 3/1984 | Yuda et al. | 411/2 X |
| 4,884,934 | 12/1989 | Ikeda et al. | 411/395 X |

FOREIGN PATENT DOCUMENTS

| | | | |
|---|---|---|---|
| 2934547 | 3/1981 | Fed. Rep. of Germany | 411/2 |
| 2088508 | 6/1982 | United Kingdom | 411/395 |

Primary Examiner—Rodney M. Lindsey
Attorney, Agent, or Firm—Dick and Harris

[57] ABSTRACT

A tamper proof sealing apparatus (10) for articles of packaging (100) wherein, the apparatus (10) includes a stud member (13) having an enlarged tab member (15) detachably associated therewith; and, a collar member (20) adapted to engage the stud member (13) in a unilateral direction; such that the collar member (20) cannot be removed from the stud member (13) without first disengaging the tab member (15) from the stud member (15).

6 Claims, 2 Drawing Sheets

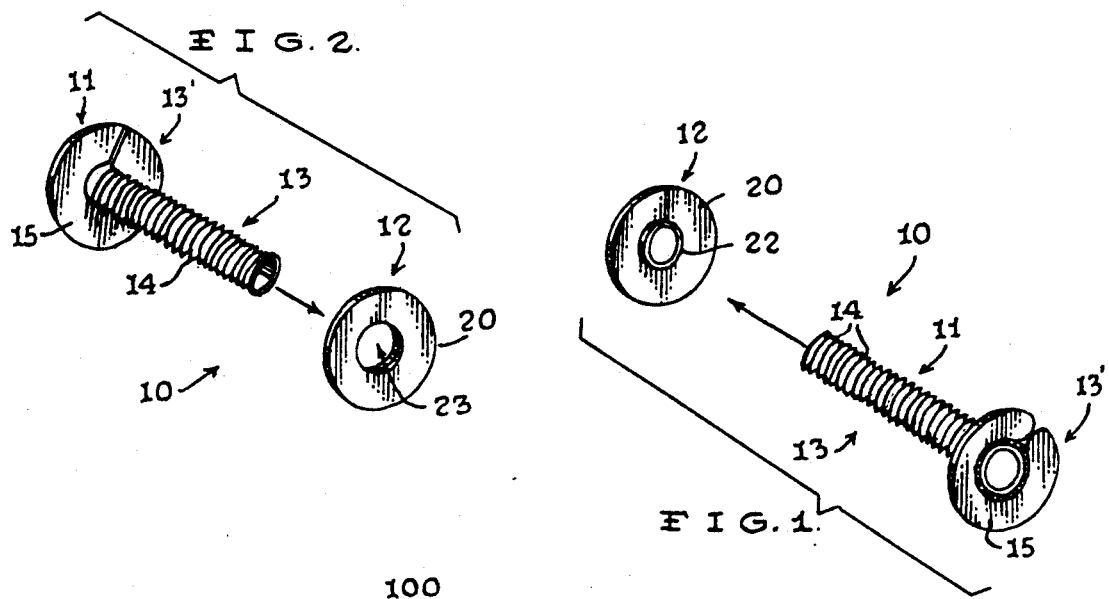
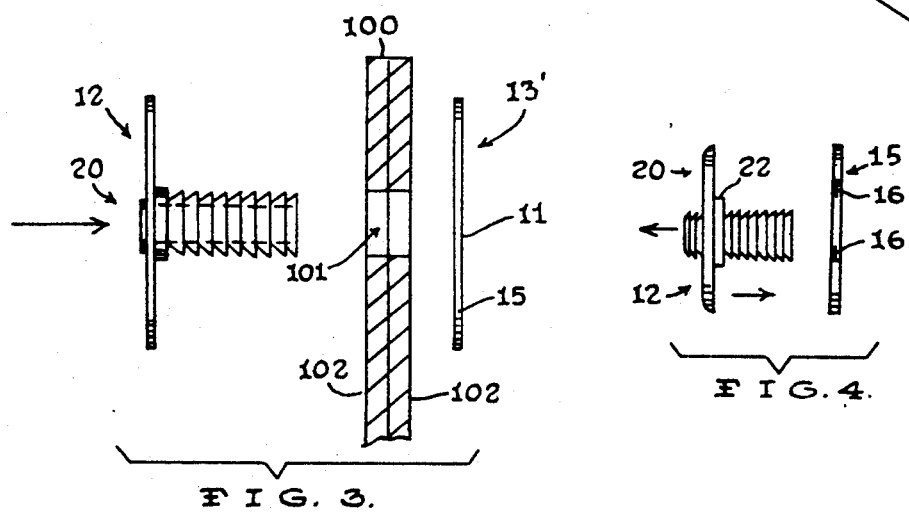
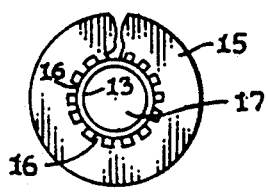
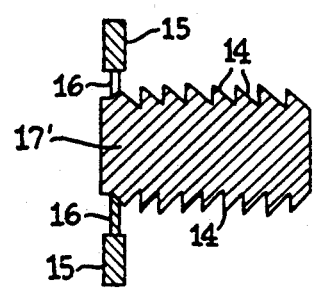

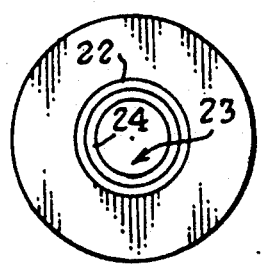
FIG.6.
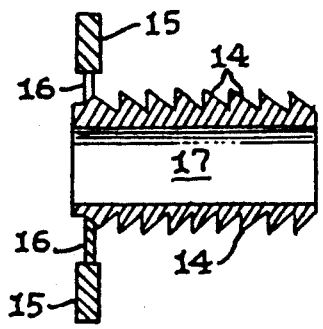
FIG.7.
FIG.9.
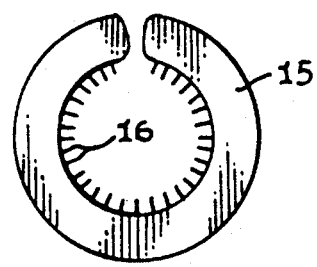
FIG.8.
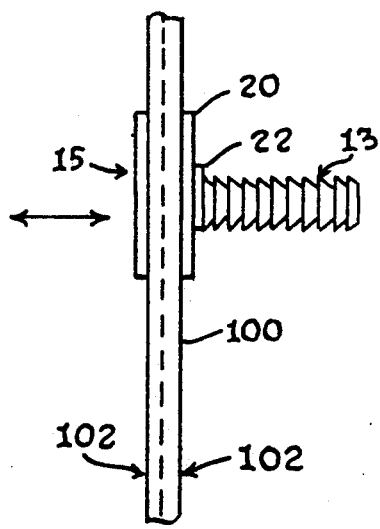
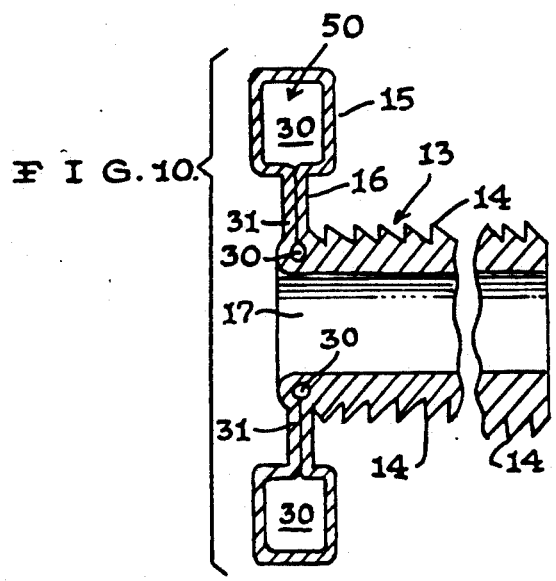
FIG.10.
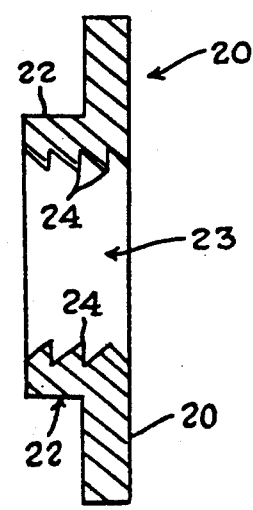

TAMPER PROOF FASTENING APPARATUS

TECHNICAL FIELD

The present invention relates to the field of fastening devices in general, and in particular to a tamper proof fastening apparatus that will give an unmistakable visual indication that the possibility exists that the contents of a package may have been tampered with when sealing strip is no longer attached to the remainder of the apparatus.

BACKGROUND ART

As can be seen by reference to the following U.S. Pat. Nos. 2,843,309; 3,974,938; 3,994,412; and 4,175,604; the prior art is replete with myriad and diverse tamper proof sealing arrangements.

While all of the aforementioned prior art constructions are more that adequate for the basic purpose and function for which they have been specifically designed, these patented devices do not provide the same degree of dramatic visual warning that is produced by the subject matter of the present invention.

As most people are no doubt aware product tampering has assumed a role of critical importance to manufactures of all types of products; and new ways are constantly being sought to provide a warning to consumers that the possibility exists that the contents of a package or other container may have been tampered with after the package left the factory.

As a consequence of the foregoing situation, there has existed a longstanding need for a new type of tamper proof sealing apparatus that employs a unidirectional engagement between the primary components; wherein, one of the components has a portion that must be physically separated from the remainder of the component to accomplish the disengagement of the components; and, the provision of such a construction is a stated objective of the present invention.

DISCLOSURE OF THE INVENTION

Briefly stated, the tamper proof sealing apparatus that forms the basis of the present invention comprises two main components; a stud unit and a collar unit. As mentioned previously the stud unit and the collar unit engage one another in a unidirectional manner via cooperating toothed surfaces which will only accept the passage of the stud unit through the collar unit in one direction.

In addition the stud unit is further provided with an outwardly projecting flanged tab member that at least partially surrounds the periphery of the stud unit; wherein, the presence of the flanged tab member at least temporarily limits the extent of travel of the collar unit relative to the stud unit.

As will be explained in greater detail further on in the specification, the tab member is operatively attached to the periphery of the stud unit by a plurality of discrete spokes; wherein, the spokes are designed to be frangible to effect the separation of the tab member from the stud unit to permit the stud unit to be disengaged from the collar unit.

In addition in an alternate version of the preferred embodiment a fluid chamber is provided in the stud unit; wherein, the fluid chamber is fluid communication with at least some of the spokes; whereby, the frangible destruction of the spokes will release a marking fluid to further discourage unauthorized tampering with the fastening apparatus.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the operative engagement between the stud unit and the collar unit;

FIG. 2 is a reverse perspective view of the engagement depicted in FIG. 1;

FIG. 3 is an exploded perspective view of the engagement of the tamper proof sealing apparatus with an article;

FIG. 4 is a side plan view of the apparatus in the process of disengaging the collar unit from the stud unit;

FIG. 5 is an end view of the stud unit;

FIG. 6 is an end view of the collar unit;

FIG. 7 is a cross sectional view of one version of the stud unit;

FIG. 8 is an end view of the flanged tab member after separation of the tab member from the stud unit;

FIG. 9 is a side plan view of the apparatus operatively engaged with an article;

FIG. 10 is an enlarged partial cross-sectional detail view of one form of an alternate version of the preferred embodiment; and FIG. 11 is a cross sectional view of one version of the stud unit.

BEST MODE FOR CARRYING OUT THE INVENTION

As can be seen by reference to the drawings, and in particular to FIG. 1, the tamper proof fastening apparatus that forms the basis of the present invention is designated generally by the reference numeral (10). The apparatus (10) comprises in general a stud unit (11) and a collar unit (12). These units will now be described in seriatim fashion.

As shown in FIGS. 1 through 3 and 5, the stud unit (11) comprises in general an elongated generally cylindrical stud member (13) having a plurality of outwardly projecting generally frustroconical radial teeth (14) disposed along the length of the stud member (13); wherein, the angled surfaces of the teeth (14) are disposed in the direction of the inboard end (13') of the stud member (13).

In addition, the inboard end (13') of the stud member (13) is further provided with an enlarged outwardly projecting generally thin; flat, flanged tab member (15) which is operatively connected to the periphery of the stud member (13) by a plurality of discrete radial spoke elements (16), whose purpose and function will be described presently.

As can also be seen particularly by reference to FIGS. 5 and 7, in the preferred embodiment of the invention the stud member (13) is provided with an enlarged axial bore (17) which is dimensioned to receive an elongated support peg (not shown) from which the article (100) to which the apparatus (10) is operatively connected to, is suspended from for display purposes.

However it should also be noted that under certain circumstances this invention also contemplates the provision of a solid axial core 17; as shown in FIG. 11, for the stud member (13) in lieu of the enlarged axial bore (17).

Furthermore as shown in FIGS. 5, and 8, the flanged tab member (15) only partially surrounds the periphery of the stud member (13); and, the spoke elements (16) are designed to be frangible to allow the tab member (15) to be physically separated from the stud member (13) for reasons to be explained presently.

Turning now to FIGS. 1 through 4 and 6, it can be seen that the collar unit comprises a collar member (20) having a reduced diameter hub element (22) which is centrally disposed on, and projects outwardly from the inboard side (21') of the disk element.

In addition, the collar member (20) is further provided with an axial bore (23) which extends through the disk element (21) as well as the hub element (22); wherein, the internal periphery of the axial bore (23) is provided with a plurality of inwardly projecting teeth (24) which are dimensioned to be the reciprocal of the outwardly projecting radial teeth (14) on the stud member (13) such that the stud member (13) can only be received in one direction relative to the collar member (20), to permit the passage of the stud member (13) through the collar member (20), until the collar member (20) engages either the tab member (15) or an intermediate portion of the product packaging (100).

Turning now to the alternate version of the preferred embodiment depicted in FIG. 10, it can be seen that a fluid chamber (30) is formed in the stud unit (11) wherein at least a portion (31) of the fluid chamber (30) extends through the spoke elements (16) connecting the tab member (15) to the stud member (13); and, wherein the main fluid reservoir may be located in the tab member (15) and/or the stud member (13) to supply a marking fluid (50) to the intermediate spoke elements (16); wherein, the severing of the frangible spoke elements (16) will allow the marking fluid to be deposited on the hands of the person removing the tab member (15) from the stud member (13) to gain access to the contents of the packaging.

In this particular version the marking fluid (50) may either be a permanent dye to mark an individual in a restricted environment for a relatively long period of time, or a colorless odorless magnetic fluid whose presence would be detected by an appropriate sensor (not shown) such as might be employed in an unrestricted environment such as a commercial establishment.

It should also be appreciated that as can be seen particularly be reference to FIGS. 3, 4 and 8, the tamper proof securing apparatus (10) that forms the basis of the present invention is designed to be employed, such that the stud member (13) will pass through a suitably dimensioned aperture (101) in an article of packaging (100); wherein the interior surfaces of the disk element (21) of the collar member (20) and the tab member (15) may be brought into tight frictional engagement with the exterior walls (102) of the packaging.

Once the stud member (13) and the collar member (20) are brought into operational engagement with one another, by forcing in the collar member (20) over the outboard end of the stud member (15), the only way that disengagement can occur between the stud unit (11) and collar unit (12) is through the removal of the tab member (15) by severing the spokes (16) so that the collar member (20) can pass over the inboard end of the stud member (13).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A tamper proof sealing apparatus for passing through an aperture in an article of packaging wherein the apparatus comprises:
   a stud unit including: a generally cylindrical stud member dimensioned to be received in the aperture in said article of packaging; and a tab member operatively associated with the stud member; wherein, the tab member projects outwardly from the periphery of the stud member,
   a collar unit including a collar member having an axial bore dimensioned to engage the outer periphery of the stud member;
   means associated with both the stud member and the collar member wherein the stud member can pass through the collar member in only one direction; and
   the tab member is operatively attached to the stud member via a plurality of discrete spoke elements.

2. The apparatus as in claim 1; wherein, the stud member is provided with an axial bore.

3. The apparatus as in claim 1; wherein, the tab member at least partially surrounds said stud member.

4. The apparatus as in claim 1; wherein, the tab member only partially surrounds said stud member.

5. The apparatus as in claim 1; wherein, said means associated with the stud member and the collar member comprises a plurality of complimentary teeth formed on the exterior of said stud member and the interior of the axial bore of said collar member.

6. The apparatus as in claim 1; wherein, the stud member is solid.

* * * * *